May 8, 1934.  J. R. GAMMETER  1,958,139
SPROCKET CHAIN AND METHOD FOR MAKING THE SAME
Filed Sept. 19, 1930  2 Sheets-Sheet 1

INVENTOR
JOHN R. GAMMETER.
By Ely & Barrow
ATTORNEYS

May 8, 1934.  J. R. GAMMETER  1,958,139

SPROCKET CHAIN AND METHOD FOR MAKING THE SAME

Filed Sept. 19, 1930  2 Sheets-Sheet 2

INVENTOR
JOHN R. GAMMETER
By Ely J. Barrow
ATTORNEYS

Patented May 8, 1934

1,958,139

UNITED STATES PATENT OFFICE 1,958,139

SPROCKET CHAIN AND METHOD FOR MAKING THE SAME

John R. Gammeter, Akron, Ohio

Application September 19, 1930, Serial No. 482,986

3 Claims. (Cl. 74—32)

This invention relates to sprocket chains such as may be employed in apron wheel, link belt, bucket conveyor or other sprocket chain constructions and particularly constructions where the chain is subjected to heavy usage in the presence of water and gritty substances or both.

The general purpose of the invention is to provide an improved sprocket chain of the classes referred to in which the connections between the links include elements of tough, resilient material such as rubber so secured to the links and pin connections that the links are entirely separated by rubber and relative angular movement of the links is absorbed by torsion in the rubber and the pull in the chain by compression in the rubber without any wear between the parts which are not affected either by water or grit, the chain always remaining freely flexible and substantially non-stretchable.

A further purpose of the invention is to provide a simple effective method for making such chains.

The foregoing and other objects of the invention are attained in the sprocket chain shown in the accompanying drawings and described below. It is to be understood that the invention is not limited to the specific form thereof shown and described.

Of the accompanying drawings.

Figure 1:
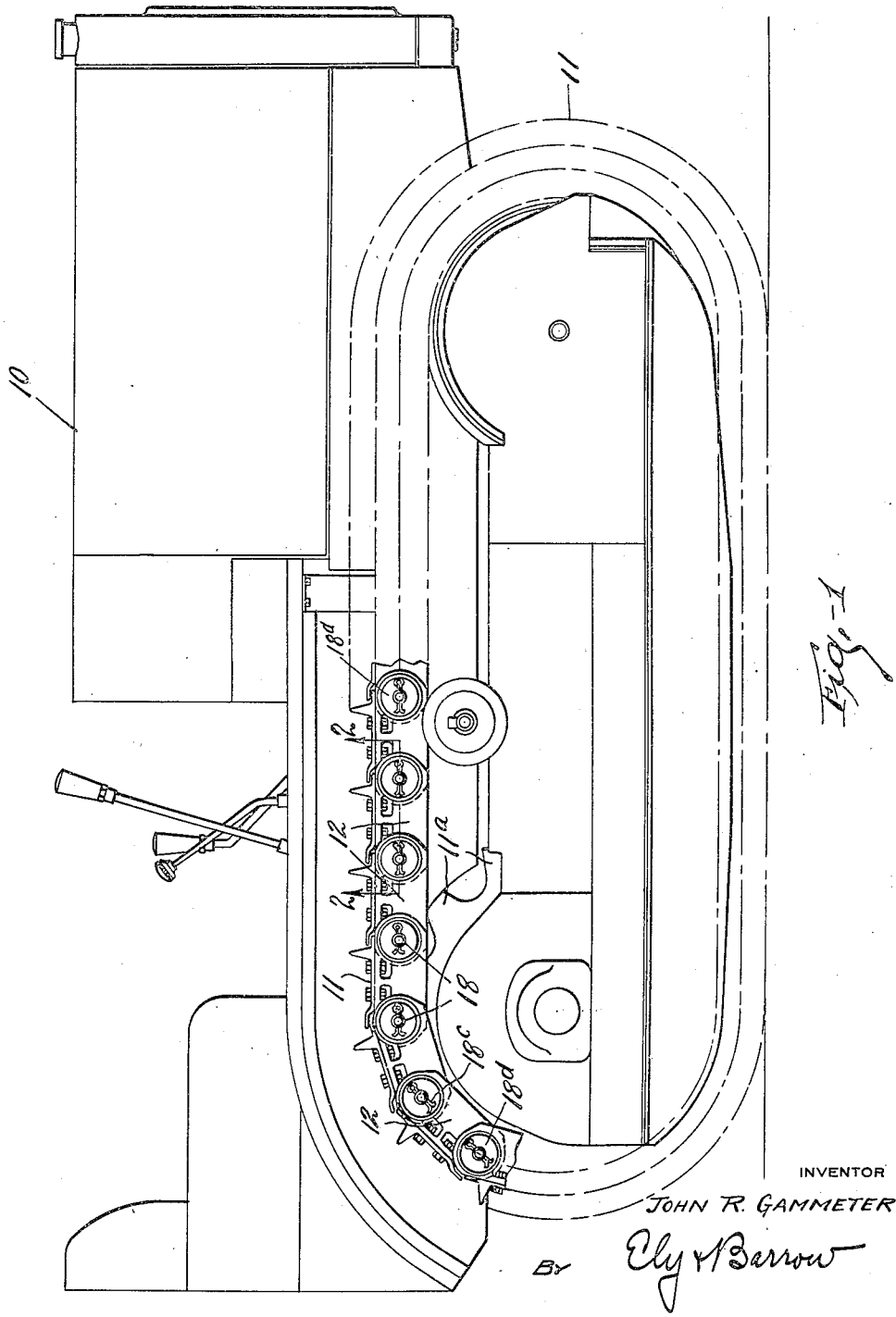
Figure 1 is an elevation of a tractor having an apron wheel thereon including an apron embodying the invention.
Figure 2:
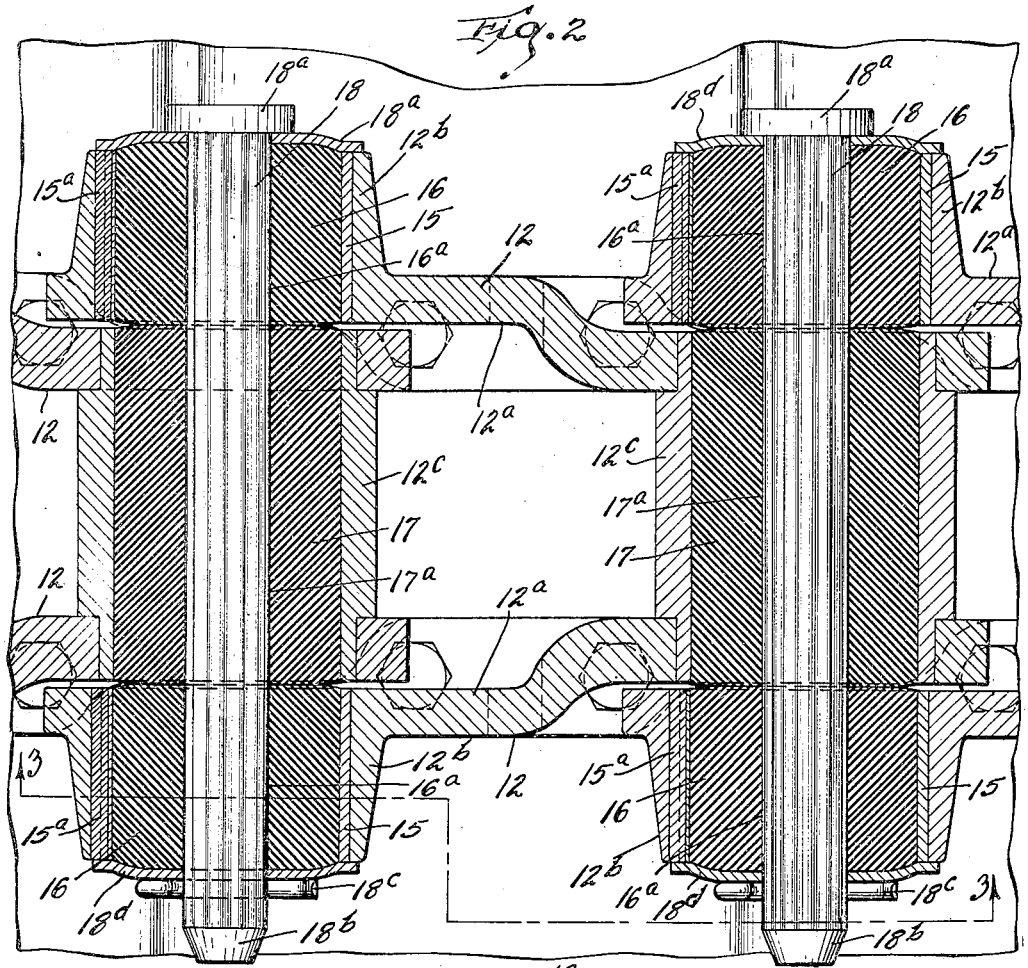
Figure 2 is a section on line 2—2 of Figure 1.
Figure 3:
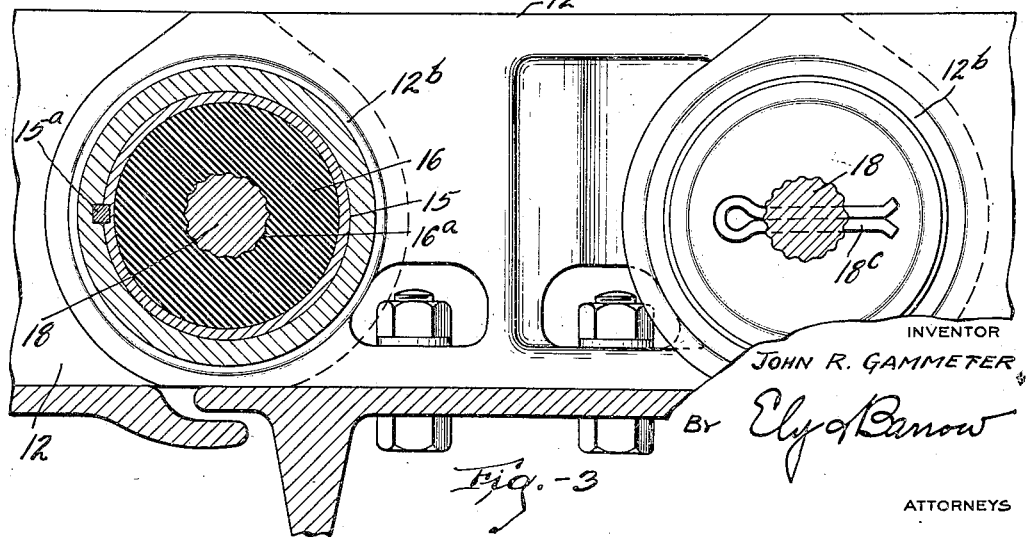
Figure 3 is a section on line 3—3 of Figure 2.

Referring to the drawings, the numeral 10 designates a tractor having thereon an apron wheel 11 embodying the invention. As best shown in Figures 2 and 3, this wheel comprises an apron or sprocket chain including links 12 comprising side members 12ª, 12ª formed with a pair of apertured members 12ᵇ, 12ᵇ at one end and with a single apertured member 12ᶜ between the sides at the other end, the pair of apertured members 12ᵇ at one end of each link being adapted to embrace the apertured member 12ᶜ of the next link in the chain with the apertures in the adjacent links aligned. The members 12ᶜ are shown of cylindrical formation so as to mesh with the teeth 11ª of the sprocket wheels used in apron wheel 11. The specific construction of the links shown is well-known and need not be further described.

The apertured members 12ᵇ are designed to receive tubular shells or sleeves 15 in which a body of tough, resilient material such as rubber 16 is formed, said rubber being bonded to the inner surfaces of the shells 15 preferably by vulcanization. Said sleeves are secured in apertured members 15 as by shrinking or force-fitting or may be keyed therein as indicated at 15ª.

The apertured members 12ᶜ are also provided with bodies of rubber or the like 17 therein and bonded to the inner surface thereof preferably by vulcanization.

These members are of hardened steel to take the wear in passing about the sprockets, and are easily replaceable when worn out, being removable from between the side members 12ª as will be apparent from Figure 2.

The bodies 16 and 17 of rubber are initially formed with apertures 16ª and 17ª therein adapted to be aligned when the links are assembled to receive the connecting pins 18. These apertures are initially formed of considerably less size than the pins 18 so that the latter must be forced into the apertures under heavy pressure such as by means of a fluid pressure press. To aid in assembling the chain the apertures are first lubricated by soaping or the like to facilitate forcing of pins 18 in place. Instead of soaping the pins either these or the apertures in the rubber bodies may be coated with a rubber cement or the like which will lubricate the parts for assembly and will upon drying provide a bond between the pins and the rubber bodies. These cements may be compounded to vulcanize under atmospheric conditions in a short time after application.

The pins 18 may be longitudinally corrugated as shown in Figure 3 and may have heads 18ª on one end and tapered formations 18ᵇ on the other ends to facilitate forcing of the pins into place. The pins may be secured by keys 18ᶜ inserted through the tapered ends thereof after the pins are driven in place. Protective plates or washers 18ᵈ may be arranged on the pins to cover the outer surfaces of the rubber bodies 15.

As will be apparent from Figure 2, the rubber in the apertures 12ᵇ and 12ᶜ is under heavy compression (such that the rubber bulges outwardly at the ends of the apertures). By reason of their connection with the interior surfaces of the apertures in the links and its force-fitting on the pins 18, the rubber bodies allow relative angular movement of the links as in passing about sprockets by torsion in the rubber. Due to the fact that the rubber is under initial compression a rubber compound of a certain normal modulus of elasticity when not under stress will have a higher modulus of elasticity in the joint. In other words, the distance through which a given compressive force will act on the rubber body is less when the body is already in a state of compression than when it is not already in a stressed condition. The rubber body under initial heavy compression accordingly holds the link pivots to movements within narrow limits preventing such elongation of the effective lengths of the links as would cause the chain to "climb" the sprockets. Moreover, the rubber bodies will not deteriorate or break down as rapidly due to torsional stresses which are substantially reduced under those developed on a tensioned rubber mounting. These rubber bodies also assume the load of the pull on the chain and in the case of the tractor the load of the weight on the chain by compression in the rubber.

As will be apparent there are no relatively movable metal parts in the chain which might contact objectionably, the bulging end portions of the compressed rubber bushings preventing objectionable contact of the adjacent relatively movable metal end surfaces. In the event of breakage, the broken link may be easily replaced by forcing out the pins 18 and assembling a new link in place thereof.

Modifications of the invention may be resorted to without departing from the spirit thereof or the scope of the appended claims.

What is claimed is:—

1. A sprocket chain comprising metal links and a hinge-joint between adjacent links, said hinge-joint comprising an inner metal member connected to one of the links, an outer metal member connected to the other link, and a rubber member mounted between said members and held under radial compression independently of driving strain thereon, for strongly resisting approach of the two said members while permitting, by torsion, the hinging action of the links.

2. A sprocket chain as defined in claim 1 in which the hinge-joint comprises at least two radially compressed rubber members in series operatively between the two links, for high amplitude of hinging movement.

3. A sprocket chain as defined in claim 1 in which the inner metal member is a corrugated pin.

JOHN R. GAMMETER.